United States Patent
Ogawa

(10) Patent No.: US 9,476,721 B2
(45) Date of Patent: Oct. 25, 2016

(54) TRAVEL SUPPORT DEVICE, TRAVEL SUPPORT METHOD, AND DRIVE SUPPORT SYSTEM

(71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/612,813

(22) Filed: Feb. 3, 2015

(65) Prior Publication Data

US 2015/0241228 A1 Aug. 27, 2015

(30) Foreign Application Priority Data

Feb. 24, 2014 (JP) ................. 2014-033462

(51) Int. Cl.
- *B60L 9/00* (2006.01)
- *B60L 11/00* (2006.01)
- *G05D 1/00* (2006.01)
- *G05D 3/00* (2006.01)

(Continued)

(52) U.S. Cl.
CPC .............. *G01C 21/34* (2013.01); *B60W 20/12* (2016.01); *G01C 21/3667* (2013.01); *B60W 2550/142* (2013.01); *B60W 2550/145* (2013.01); *B60W 2550/402* (2013.01); *Y02T 10/7258* (2013.01)

(58) Field of Classification Search
CPC .. G01C 21/3673; G01C 21/32; G01C 21/34; G01C 21/30; G01C 21/28; G01C 21/365; G01C 21/3647; G01C 19/5719; G01C 21/3423; G01C 21/3476; G01C 21/3484; B60W 2510/244; B60W 20/12; B60W 10/08; B60W 20/20; B60W 50/14; B60W 20/13
USPC ......... 701/11, 117, 22, 300, 533, 45, 25, 70, 701/102, 24, 26, 27, 1, 409, 468, 411, 412, 701/423, 455

See application file for complete search history.

(56) References Cited

U.S. PATENT DOCUMENTS

| | | | |
|---|---|---|---|
| 6,487,477 B1 * | 11/2002 | Woestman | B60K 6/365 180/65.235 |
| 6,570,265 B1 * | 5/2003 | Shiraishi | B60K 6/26 180/65.235 |

(Continued)

FOREIGN PATENT DOCUMENTS

| | | | |
|---|---|---|---|
| JP | 2009-012605 A | 1/2009 | |
| JP | 2010-132240 A | 6/2010 | |

(Continued)

*Primary Examiner* — Luis A Martinez Borrero
(74) *Attorney, Agent, or Firm* — Oliff PLC

(57) ABSTRACT

A travel support device includes a planner adapted to plan vehicle travel modes to be respectively assigned to each of a plurality of sections into which a travel route from a current location to a destination is divided. To each of the sections, the planner is adapted to assign, based on a road load associated with each section, a travel mode among a first mode, in which the remaining energy charge of the battery of the vehicle is not maintained, and a second mode, in which the remaining energy charge of the battery is maintained. The planner is adapted to identify, from among the sections, an excessive altitude change section, in which a change of altitude is predicted to be greater than or equal to a predetermined value, and assign the second mode with priority to the excessive altitude change section.

12 Claims, 4 Drawing Sheets

(51) Int. Cl.
 *G06F 7/00* (2006.01)
 *G06F 17/00* (2006.01)
 *G01C 21/34* (2006.01)
 *G01C 21/36* (2006.01)

(56) References Cited

U.S. PATENT DOCUMENTS

| | | | | |
|---|---|---|---|---|
| 8,187,146 B2* | 5/2012 | Allgaier | | B60K 6/48 180/65.28 |
| 8,290,700 B2* | 10/2012 | Yamada | | B60K 6/46 180/65.29 |
| 8,457,880 B1* | 6/2013 | Malalur | | G01C 21/30 701/410 |
| 8,527,132 B2* | 9/2013 | Mineta | | B60W 20/00 700/291 |
| 8,543,272 B2* | 9/2013 | Yu | | B60W 50/0097 180/65.265 |
| 8,606,443 B2* | 12/2013 | Pandit | | B60K 6/485 180/65.1 |
| 8,650,193 B1* | 2/2014 | Pilloff | | G09B 29/106 701/409 |
| 8,688,299 B2* | 4/2014 | Saito | | B60K 6/48 180/65.21 |
| 8,781,675 B2* | 7/2014 | Yoshida | | B60T 1/10 180/65.28 |
| 9,057,621 B2* | 6/2015 | Tate, Jr. | | G01C 21/3469 |
| 9,120,395 B2* | 9/2015 | Santucci | | B60L 11/1861 |
| 2004/0230376 A1* | 11/2004 | Ichikawa | | G01C 21/26 702/2 |
| 2006/0293844 A1* | 12/2006 | Sawaki | | G01C 21/30 701/533 |
| 2009/0271113 A1* | 10/2009 | Chang | | G01C 21/3415 701/472 |
| 2009/0300053 A1* | 12/2009 | Denaro | | B60W 10/06 |
| 2010/0152939 A1* | 6/2010 | Yamada | | B60K 6/46 701/22 |
| 2011/0246004 A1* | 10/2011 | Mineta | | B60W 20/12 701/22 |
| 2011/0276209 A1 | 11/2011 | Suganuma et al. | | |
| 2012/0053771 A1* | 3/2012 | Yoshida | | B60L 11/1842 701/22 |
| 2012/0179362 A1* | 7/2012 | Stille | | G01C 21/3469 701/410 |
| 2013/0332020 A1* | 12/2013 | Uchihara | | B60W 20/12 701/22 |
| 2014/0163865 A1* | 6/2014 | Mineta | | B60W 20/00 701/409 |
| 2015/0057860 A1* | 2/2015 | Katakura | | B60K 6/48 701/22 |
| 2015/0134206 A1* | 5/2015 | Matsunaga | | B60W 20/104 701/48 |
| 2015/0232097 A1* | 8/2015 | Luther | | B61L 3/006 701/123 |
| 2015/0241227 A1* | 8/2015 | Ogawa | | G01C 21/3469 701/22 |
| 2015/0241234 A1* | 8/2015 | Ogawa | | B60W 50/0097 701/22 |

FOREIGN PATENT DOCUMENTS

JP 2015-030407 A 2/2015
WO 2015/019142 A1 2/2015

* cited by examiner

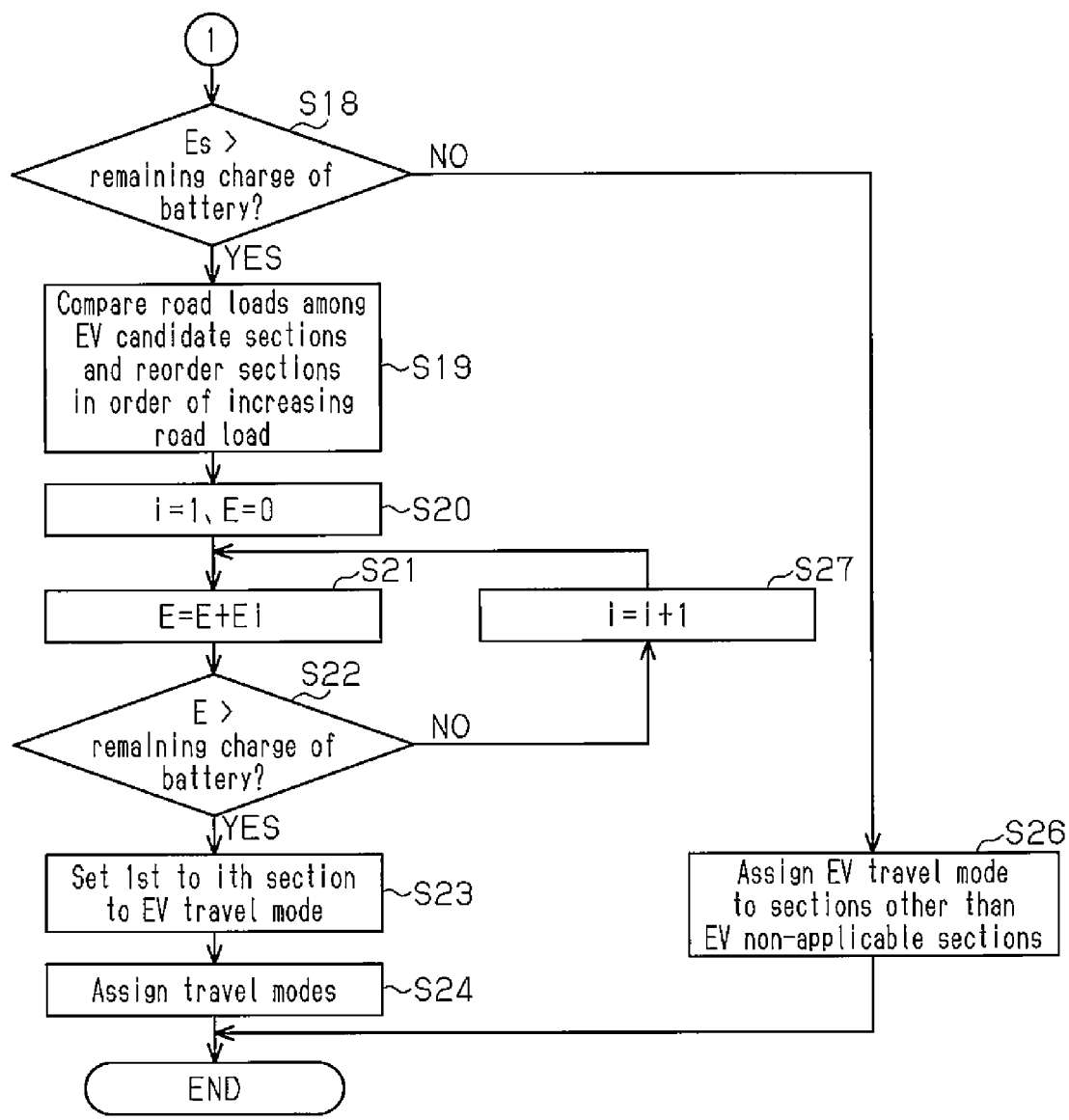

TRAVEL SUPPORT DEVICE, TRAVEL SUPPORT METHOD, AND DRIVE SUPPORT SYSTEM

BACKGROUND OF THE INVENTION

The present invention relates to a travel support device, a travel support method, and a drive support system that support travel from a current location to a destination of a vehicle provided with an internal combustion engine and a motor as drive sources.

As a vehicle capable of selectively switching among a plurality of travel modes, a hybrid vehicle, which uses both an internal combustion engine and a motor as its drive sources, is known. As the travel modes, the hybrid vehicle has an electric vehicle (EV) travel mode that places priority on EV travel, in which the internal combustion engine is stopped and only the motor is used to travel, a hybrid vehicle (HV) travel mode that places priority on HV travel, in which the internal combustion engine and the motor are used to travel. The EV travel mode is a travel mode in which the remaining energy charge of the battery is not maintained and the HV travel mode is a travel mode in which the remaining energy charge of the battery is maintained. Also, a travel support device that is installed in the hybrid vehicle and includes a navigation system provides support by calculating a travel route from the current location to a destination based on information such as map information and road traffic information and selecting the travel mode to be applied to each of a plurality of sections in the travel route. For example, Japanese Laid-Open Patent Publication No. 2009-12605 discloses an example of a vehicle controller having such a travel support function.

In the vehicle controller described in Japanese Laid-Open Patent Publication No. 2009-12605, the travel modes of the respective sections in the travel route are set in consideration of the battery energy balance for the entire travel route so that the remaining energy charge of the battery, which is a rechargeable battery, becomes zero at the point of arrival at the destination. However, if road loads are calculated based on map information to set the travel modes of the respective sections in the travel route, a change of road gradient may deviate from prediction depending on the precision of the map information and the internal combustion engine may be put in operation in a section in which the EV travel mode was applied. In this case, the battery remaining charge may not become zero at the point of arrival at the destination.

Such a problem is generally common to devices and methods that assign travel modes to respective sections in a travel route for a vehicle having a plurality of travel modes that differ in battery energy balance.

SUMMARY OF THE INVENTION

An object of the present invention is to provide a travel support device, a travel support method, and a drive support system capable of promoting the optimization of battery consumption in a travel route.

To achieve the foregoing objective and in accordance with a first aspect of the present invention, a travel support device is provided for supporting a vehicle having an internal combustion engine and a motor as drive sources to move from a current location to a destination. The travel support device includes a planner adapted to plan vehicle travel modes to be respectively assigned to each of a plurality of sections into which a travel route from the current location to the destination is divided. To each of the plurality of sections, the planner is adapted to assign, based on a road load associated with the respective sections, a travel mode among a first mode, in which a remaining energy charge of a battery of the vehicle is not maintained, and a second mode, in which the remaining energy charge of the battery is maintained. The planner is adapted to identify, from among the plurality of sections, an excessive altitude change section, in which a change of altitude is predicted to be greater than or equal to a predetermined value, and assign the second mode with priority to the excessive altitude change section.

To achieve the foregoing objective and in accordance with a second aspect of the present invention, a travel support method is provided for supporting a vehicle having an internal combustion engine and a motor as drive sources to move from a current location to a destination. The method includes: dividing a travel route from the current location to the destination into a plurality of sections; and planning vehicle travel modes to be respectively assigned to each of the plurality of sections, wherein the travel modes are planned by assigning, to each of the plurality of sections and based on a road load associated with respective sections, a travel mode among a first mode, in which a remaining energy charge of a battery of the vehicle is not maintained, and a second mode, in which the remaining energy charge of the battery is maintained. The planning of the travel modes includes identifying, from among the plurality of sections, an excessive altitude change section, in which a change of altitude is predicted to be greater than or equal to a predetermined value, and assigning the second mode with priority to the excessive altitude change section.

To achieve the foregoing objective and in accordance with another aspect of the present invention, a drive support system is provided for supporting driving of a vehicle having an internal combustion engine and a motor as drive sources. The system includes comprising the travel support device according the first aspect. The travel support device is adapted to assign one travel mode selected from a plurality of different travel modes of the vehicle to each of a plurality of sections into which a travel route from a current location to a destination of the vehicle is divided and plan the vehicle travel modes based on the assignment.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 2A and 2B are flowcharts of a procedure of a travel mode planning process performed by the travel support device shown in FIG. 1.

DETAILED DESCRIPTION OF THE PREFERRED EMBODIMENTS

A travel support device, a travel support method, and a drive support system according to one embodiment will now be described with reference to FIGS. 1, 2A, and 2B. The travel support device, the travel support method, and the drive support system according to the present embodiment are applied to a hybrid vehicle that uses as drive sources an electric motor 114 using a battery constituted of a rechargeable battery as a power source and an internal combustion engine 115 using gasoline or other fuel as a power source.

Figure 1:
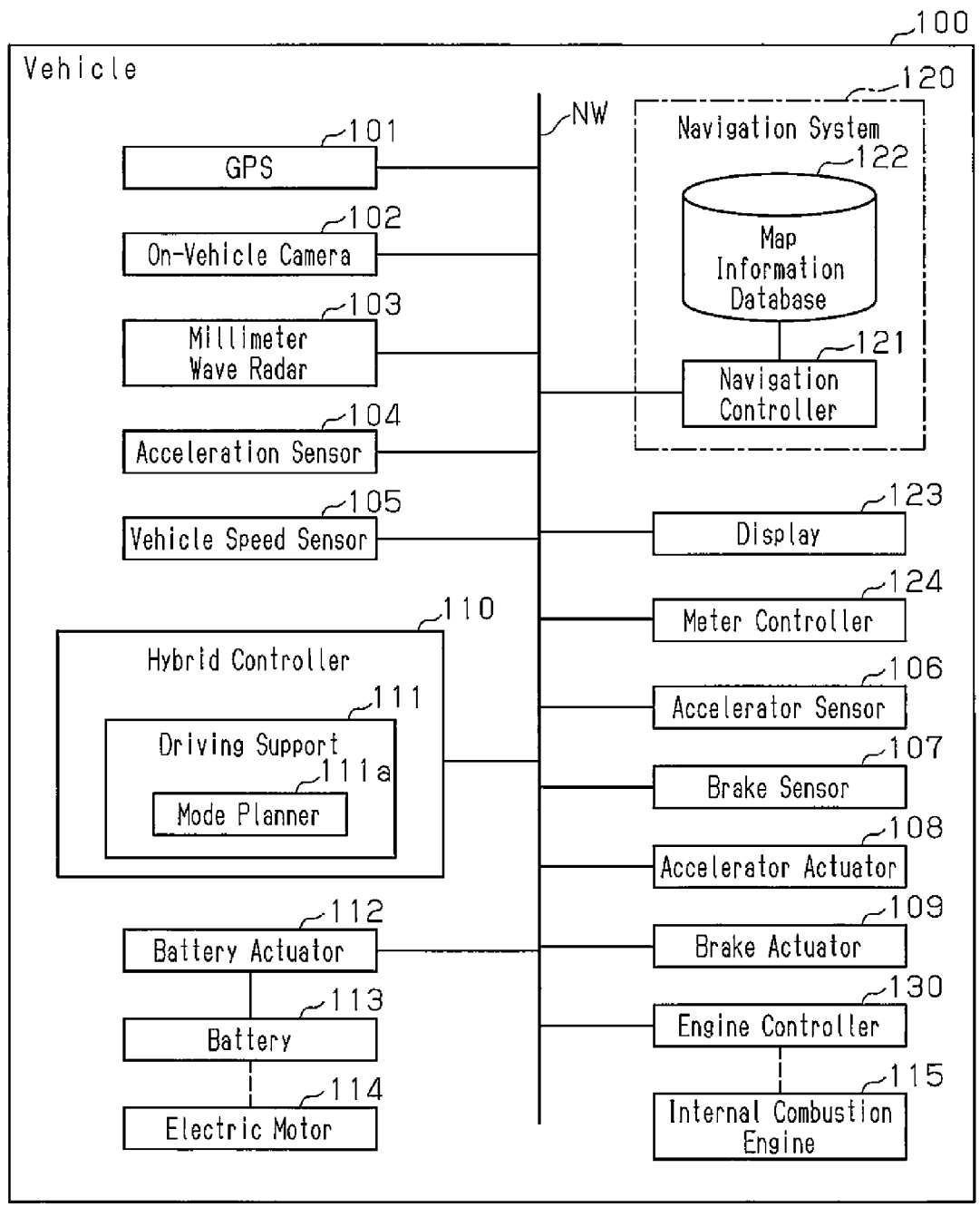
FIG. 1 is a block diagram of a schematic configuration of a travel support device according to one embodiment.

As shown in FIG. 1, a vehicle 100 has as devices for detecting a traveling state of the vehicle 100, for example, a global positioning system (GPS) 101, an on-vehicle camera 102, a millimeter wave radar 103, an acceleration sensor 104, and a vehicle speed sensor 105. The GPS 101, the on-vehicle camera 102, the millimeter wave radar 103, the acceleration sensor 104, and the vehicle speed sensor 105 are connected via an on-vehicle network NW to a hybrid controller 110, a navigation controller 121 of a navigation system 120, and an engine controller 130. As the on-vehicle network NW, for example, a control area network (CAN) is used. Also, each of the hybrid controller 110, navigation controller 121, and engine controller 130 is an electronic control unit (ECU), in other words, a processor and includes a small computer that includes an arithmetic device and a storage device. Each of the hybrid controller 110, navigation controller 121, and engine controller 130 is capable of performing various control processes by the arithmetic device executing computations in accordance with programs stored in the storage device.

The GPS 101 receives signals from GPS satellites to detect the location of the vehicle 100, for example, in the form of latitude and longitude based on the received signals. Also, the GPS 101 outputs location information of the detected vehicle 100. The on-vehicle camera 102 performs imaging of the surrounding environment of the vehicle 100 and outputs image data obtained by the imaging. The millimeter wave radar 103 detects the presence of an object in the vicinity of the vehicle 100 by using radio waves in the millimeter wave band and outputs a signal corresponding to the detection result.

The acceleration sensor 104 detects the acceleration of the vehicle 100 and outputs a signal corresponding to the detected acceleration. The vehicle speed sensor 105 detects the rotational speed of a wheel of the vehicle 100 and outputs a signal corresponding to the detected rotational speed.

An accelerator sensor 106 detects the amount by which an accelerator pedal is operated by the driver and outputs a signal corresponding to the accelerator pedal operation amount. A brake sensor 107 detects the amount by which a brake pedal is operated by the driver and outputs a signal corresponding to the detected brake pedal operation amount.

The vehicle 100 is also provided with an accelerator actuator 108, which controls the operation of the internal combustion engine 115, and a brake actuator 109, which controls the brake. The accelerator actuator 108 and the brake actuator 109 are electrically connected to the on-vehicle network NW. The accelerator actuator 108 controls the internal combustion engine 115 based on a drive control amount for the internal combustion engine 115, which is calculated by the engine controller 130 according to the detection value of the accelerator sensor 106. Also, the brake actuator 109 controls the brake based on a control amount for the brake, which is calculated by the engine controller 130 according to the detection value of the brake sensor 107.

Further, the vehicle 100 includes the electric motor 114, which is a drive source, a battery 113, which is a power source of the electric motor 114, and a battery actuator 112, which controls charging/discharging of the battery 113. The battery actuator 112 is electrically connected to the on-vehicle network NW. The battery actuator 112 manages, for example, the charging/discharging of the battery 113. Also, the battery actuator 112 controls the discharge of the battery 113 to drive the electric motor 114 and charges the battery 113 by regeneration by the electric motor 114.

The vehicle 100 includes the hybrid controller 110, which controls operation of the internal combustion engine 115 and the electric motor 114. The hybrid controller 110 is electrically connected via the on-vehicle network NW to the battery actuator 112, the accelerator actuator 108, and the brake actuator 109.

Based on the respective detection results of the acceleration sensor 104, the vehicle speed sensor 105, and the accelerator sensor 106, the hybrid controller 110 determines an output ratio of the internal combustion engine 115 and the electric motor 114, that is, a driving force distribution of the internal combustion engine 115 and the electric motor 114. Particularly, the hybrid controller 110 changes the driving force distribution of the internal combustion engine 115 and the electric motor 114 to adjust the remaining energy charge of the battery 113. The hybrid controller 110 executes EV travel, in which the internal combustion engine 115 is stopped and the electric motor 114 is used as the drive source, and HV travel, in which the internal combustion engine 115 and the electric motor 114 are used as the drive sources.

The hybrid controller 110 selectively switches the travel mode of the vehicle 100 between a charge depleting (CD) travel mode, in which the charge amount, in other words, the remaining charge of the battery 113 is consumed, and a charge sustaining (CS) travel mode, in which the remaining charge of the battery 113 is maintained.

The CD travel mode is a travel mode in which the electric power charged in the battery 113 is consumed proactively without maintaining the remaining charge of the battery 113 and is a travel mode in which priority is placed on EV travel. Hereinafter, the CD travel mode will be described as the EV travel mode. Even when the travel mode of the vehicle 100 is switched to the EV travel mode, the internal combustion engine 115 will also be driven if the accelerator pedal is stepped on strongly to demand a large travel power.

The CS travel mode is a travel mode in which the remaining charge of the battery 113 is maintained within a predetermined range that includes a reference value and is a travel mode in which priority is placed on HV travel, in which the internal combustion engine 115 is driven as necessary to put the electric motor 114 in regenerative operation. Hereinafter, the CS travel mode will be described as the HV travel mode. Even when the travel mode of the vehicle 100 is switched to the HV travel mode, the internal combustion engine 115 is stopped if the remaining charge of the battery 113 exceeds the reference value. As the reference value of the HV travel mode, the value of the remaining charge of the battery 113 when the travel mode of the vehicle 100 is switched from the EV travel mode to the HV travel mode or the value of the remaining charge determined to be necessary for sustaining the performance of the battery 113 is set as appropriate.

Based on the distribution of driving force among the internal combustion engine 115 and the electric motor 114 under the EV travel mode or the HV travel mode that has been selected, the hybrid controller 110 generates a control instruction for the battery actuator 112 in relation to the discharging of the battery 113 and the like, and generates information related to a drive control amount of the internal combustion engine 115 that is to be calculated by the engine controller 130. Also, based on the respective detection results of the acceleration sensor 104, the vehicle speed sensor 105, and the brake sensor 107, the hybrid controller 110 determines the distribution of braking force among the brake and the electric motor 114. Based on the distribution of braking force among the brake and the electric motor 114, the hybrid controller 110 generates a control instruction for the battery actuator 112 in relation to the charging of the battery 113 and the like, and generates information related to a control amount of the brake that is to be calculated by the engine controller 130. The hybrid controller 110 outputs the various generated control instructions to the battery actuator 112 to control the charging/discharging of the battery 113. The electric motor 114 is thereby driven with the battery 113 as the power source or the battery 113 is charged by regeneration by the electric motor 114. Also, the hybrid controller 110 is capable of monitoring executing states of hybrid control and the charged rate of the battery 113.

The hybrid controller 110 selectively switches the travel mode of the vehicle 100 between the EV travel mode and the HV travel mode according to the result of selection by the driver. The hybrid controller 110 also selectively switches the travel mode of the vehicle 100 between the EV travel mode and the HV travel mode based on information related to road loads required for travel in respective sections in a travel route of the vehicle 100 that is input from the navigation controller 121 and the like. The road load is the load amount per unit distance in each section and is an average load amount required for travel in the section. On the other hand, an accumulated value of the road load required for completion of travel in each section is defined as consumption energy.

The vehicle 100 is provided with a map information database 122 in which map data are registered. The map data are data related to geography such as roads. Information related to locations such as latitude and longitude is registered in the map data together with display type data, in other words, geographical information data that enables display of geography. The display type data include display information of geographical features such as rivers, lakes, and seas. The map data may also have registered therein such information as intersection names, road names, district names, directional guides, and facility information.

Also, the map information database 122 includes information related to nodes, each of which indicates a location among a plurality of locations on roads (hereinafter referred to as "node data"), and information related to links, each of which connects two nodes (hereinafter referred to as "link data"). A node is set on the road at a location of a specific traffic element such as an intersection, a traffic signal, and a curve or at a location where the number of lanes is changed. Node data include information related to a road location at which a node is present and road information of the location. A link expresses a road section present between two nodes, that is, a road section partitioned by the two nodes. The link data include information of the two nodes included in the link and road information of the section corresponding to the link. The road information in the link data includes information of starting point location, ending point location, distance, and route, undulations of the section. The link data also include various types of data such as cost data including the road load of the section, road data including the road type, mark data indicating a specific location, intersection data indicating information of an intersection, and facility data indicating information of a facility.

To be specific, the node data may include, for example, a node ID, which is an identification number of the node, coordinates of the node, link IDs of all links connected to the node, a node type indicating the type such as intersection and junction. The node data may also include data indicating the characteristics of the node, such as an image ID that is an identification number of an image representing the node.

Also, the link data include, for example, a link ID, which is an identification number of the link, a link length, and the node IDs of the respective nodes connecting to the starting point and ending point of the link. The link data also include data indicating a road type such as expressway, toll road, ordinary road, urban/suburban road, mountain road, tunnel, bridge, and interchange as well as necessary information among data indicating the road width, the number of lanes, the link traveling time, the legal speed limit, the road gradient, and the like. Further, the link data may include data indicating averages, maximum values, minimum values of moving time, moving speed, fuel consumption, and electric power consumption as road load information that is a required output of the vehicle 100 in each link. The electric power consumption is the amount of electric power consumed by the electric motor 114 when the vehicle 100 travels in the EV travel mode and the unit thereof may be set to [kW]. The road load of a link is acquired or calculated based on such road load information. As mentioned above, the road load is the load amount per unit distance in the link and is the average load amount required for travel in the link. The consumption energy, which is the accumulated value of the road load required for completion of travel in the link, can be calculated from the road load and the link length.

The vehicle 100 includes a navigation system 120, which provides route guidance. The navigation controller 121 of the navigation system 120 acquires the latitude and longitude from the GPS 101 as information indicating the current location point of the vehicle 100. Also, when a destination point is set by the driver, the navigation controller 121 determines the latitude and longitude of the destination point. The navigation controller 121 then searches for a travel route from the current location point of the vehicle 100 to the destination point by referencing the map information database 122 and using, for example, the Dijkstra's algorithm. The navigation controller 121 also calculates, for example, the road load, moving time, moving speed, fuel consumption, and electric power consumption for the retrieved travel route. The navigation controller 121 then outputs information indicating the retrieved travel route and the calculated road load, moving time, moving speed, fuel consumption, and electric power consumption, to the hybrid controller 110 via the on-vehicle network NW and also outputs the information via the on-vehicle network NW to a display 123 provided in the passenger compartment and constituted of a liquid crystal display.

Also, the vehicle 100 is provided with a meter controller 124, which controls the display states of meters displayed on an instrument panel provided on a dashboard. The meter controller 124 acquires data indicating, for example, the charged/discharged state, of the battery 113 from the hybrid controller 110, and visually displays, for example, an energy flow in the vehicle 100 based on the acquired data. The energy flow is a flow of energy in the vehicle 100 that is generated by the charging/discharging of the battery 113 and the operation of or regeneration by the electric motor 114. The energy flow may include a flow of energy in the vehicle 100 generated by the operation of the internal combustion engine 115.

When the travel route is input, the hybrid controller 110 assigns travel modes of the vehicle 100 to the respective sections in the travel route. The hybrid controller 110 includes a driving support 111, which supports such assignment of the travel modes. The driving support 111 acquires information of the travel route to the destination point set by the driver from the navigation controller 121. Also, the driving support 111 includes a mode planner 111a, which plans the travel modes to be assigned to the respective sections in the acquired travel route. The mode planner 111a functions as a travel support device by a process of executing a program in the hybrid controller 110. That is, the mode planner 111a has the function of planning the travel modes to be assigned to the respective sections according to the road loads of the respective sections in the travel route.

Generally, good energy efficiency tends to be exhibited when traveling by the electric motor 114 is applied to a section of comparatively low road load. Also, good energy efficiency tends to be exhibited when traveling by the internal combustion engine 115 is applied to a section of high road load. The hybrid controller 110 thus assigns the EV travel mode to a section of comparatively low road load and assigns the HV travel mode to a section of comparatively high road load.

For a plurality of target sections, the mode planner 111a compares the road loads of the respective sections and successively assigns the EV travel mode starting from a section of low road load. The mode planner 111a also integrates the consumption energy of the sections to which the EV travel mode was assigned and subtracts the integrated value of consumption energy from the remaining energy charge of the battery 113. The mode planner 111a then continues to assign the EV travel mode to each section such that the integrated value of the consumption energy does not exceed the remaining energy charge of the battery 113. The mode planner 111a thereby assigns the EV travel mode to the sections of relatively low road load among all sections in the travel route. Also, the mode planner 111a assigns the HV travel mode to the sections to which the EV travel mode was not assigned.

For each section in the travel route, the gradient is calculated from altitudes in the map information related to the section and the road load is calculated as the load required for travelling the road having the calculated gradient. However, depending on the locations at which the altitudes in the map information were acquired, the gradient calculated from the map information may differ from the actual gradient of the travel route. The mode planner 111a identifies an excessive altitude change section, for which the change of altitude in the section is predicted to be greater than or equal to a predetermined value, and plans the travel modes of the vehicle 100 such that the HV travel mode is assigned with priority to the excessive altitude change section. By the HV travel mode being assigned with priority to the excessive altitude change section, operation of the internal combustion engine 115 in a section in which the EV travel mode was assigned can be suppressed.

The mode planner 111a acquires the road types of the travel route from the map information database 122 and identifies a section that includes at least one of a tunnel, a bridge, and an interchange as a road type to be an excessive altitude change section. Also, the mode planner 111a acquires the display types in the vicinity of the travel route from the map information database 122 and identifies a section that in the vicinity of at least one of a river, a lake, or a sea is included especially as a display type to be an excessive altitude change section. Further, the mode planner 111a acquires gradient information of the travel route from the map information database 122 and, based on the gradient information, identifies a section with which the change of altitude, that is, the gradient is greater than or equal to a predetermined value to be an excessive altitude change section. The mode planner 111a thus identifies the excessive altitude change sections based on information other than the altitude information included in the map data.

In addition to the excessive altitude change section, the mode planner 111a also assigns the HV travel mode with priority to a section including an expressway and a section in the vicinity of the destination. In this case, the priority decreases in the order of the section including an expressway, the excessive altitude change section, and the section in the vicinity of the destination.

The mode planner 111a outputs the travel modes assigned to the respective sections of the travel route as described above to the display 123 and makes the display 123 display the travel mode assigned to the section in which travel is being performed currently.

Whenever appropriate, the hybrid controller 110 acquires the location information of the travelling vehicle 100 to determine the section in which the vehicle 100 is currently travelling, in other words, the current section, and makes the vehicle 100 travel in the travel mode assigned to the determined current section. That is, each time the section in which the vehicle 100 is travelling transitions to the subsequent section, the hybrid controller 110 switches the travel mode of the vehicle 100 to the travel mode assigned to the subsequent section. The vehicle 100 is thereby made to travel in the travel mode assigned to the current section.

A procedure of a travel mode planning process performed by the mode planner 111a of the driving support 111 will now be described with reference to FIGS. 2A and 2B. Each time the travel route is transmitted from the navigation controller 121, the driving support 111 performs planning of the travel modes to be assigned to the respective sections in the travel route. Also, the mode planner 111a repeatedly performs planning of the travel mode at each fixed cycle. This cycle is defined as the planning cycle.

Figure 2A:
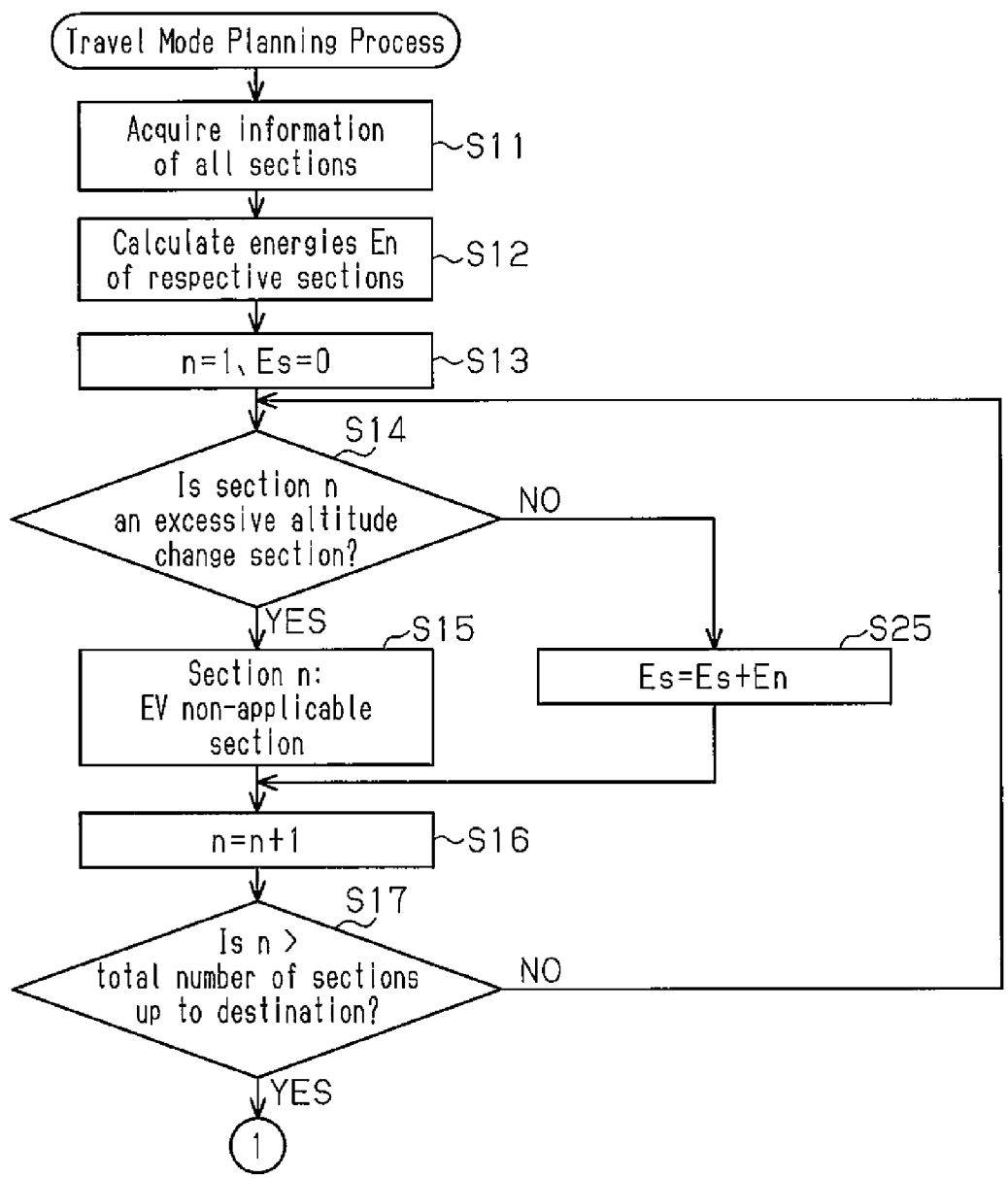

As shown in FIG. 2A, when a destination point is set by the navigation controller 121, the driving support 111 acquires route information concerning all sections in the travel route (step S11). Then based on the acquired information, the driving support 111 calculates the consumption energy En of each section (step S12).

The driving support 111 sets the value n, which expresses the order of a section, to 1 (n=1) and sets the sum Es of the consumption energy to zero (Es=0) (step S13). Hereinafter, the nth section will be expressed as a "section n." Based on the map data, the driving support 111 determines whether the section n is an excessive altitude change section (step S14). That is, the mode planner 111a determines that the section n is an excessive altitude change section when the section n corresponds to any of the following.

A section that includes a tunnel as a road type.
A section that includes a bridge as a road type.
A section that includes an interchange as a road type.
A section in the vicinity of a river as a display type.
A section in the vicinity of a lake as a display type.
A section in the vicinity of a pond as a display type.
A section in which the gradient information has a value greater than or equal to a predetermined value.

If the driving support 111 determines that the section n is an excessive altitude change section (step S14: YES), it sets the section n to an EV non-applicable section (step S15). That is, the mode planner 111a plans the travel modes of the vehicle 100 so that the EV travel mode is not assigned to the section n. To change the section to be determined whether it is an excessive altitude change section to the subsequent section, the driving support 111 renews the value n by adding 1 to the current value n (n=n+1) (step S16).

On the other hand, if the driving support 111 determines that the section n is not an excessive altitude change section, in other words, is not an EV non-applicable section (step S14: NO), it adds the consumption energy En of the section n to the current consumption energy sum Es to renew the consumption energy sum Es (Es=Es+En) (step S25). That is, the mode planner 111a calculates the consumption energy sum Es of the sections other than the EV non-applicable sections to determine whether the battery 113 is sufficient by comparing the remaining charge of the battery 113 with the consumption energy sum Es. At this point, the sections other than the EV non-applicable sections are sections that are candidates for assignment of the EV travel mode, in other words, EV candidate sections. Thereafter, the process of step S16 is executed.

The driving support 111 determines whether the value n is greater than the total number of sections up to the destination (step S17). That is, the mode planner 111a checks whether the determination of a section being or not being an excessive altitude change section has been performed on all sections up to the destination. If the driving support 111 determines that the value n does not exceed the total number of sections up to the destination (step S17: NO), it returns to step S14 and the processes of steps S14 to S17 and S25 are repeated.

Also, if the value n exceeds the total number of sections up to the destination (step S17: YES), the driving support 111 determines whether the consumption energy sum Es, calculated in step S25, is greater than the remaining charge of the battery 113 as shown in FIG. 2B (step S18). That is, the mode planner 111a determines whether all of the sections other than the EV non-applicable sections, in other words, all of the EV candidate sections can be travelled in the EV travel mode. If the driving support 111 determines that the consumption energy sum Es of the EV candidate sections is not greater than the remaining charge of the battery 113 (step S18: NO), the EV travel mode is assigned to all EV candidate sections (step S26) and the travel mode planning process is ended. The HV travel mode is assigned to the EV non-applicable sections.

On the other hand, if the driving support 111 determines that the consumption energy sum Es of the EV candidate sections is greater than the remaining charge of the battery 113 (step S18: YES), the road loads are compared among the EV candidate sections and the EV candidate sections are reordered in the order of increasing road load (step S19). With the EV candidate sections that have been reordered in the order of increasing road load, the ith section is expressed as a "section i" (i<n). Also, the consumption energy in the section i will be expressed as "Ei."

The driving support 111 sets the value i to 1 (i=1) and sets a consumption energy sum E to zero (E=0) (step S20). The driving support 111 adds the consumption energy Ei of the section i to the current consumption energy sum E to renew the consumption energy sum E (E=E+Ei) (step S21). The consumption energy sum E expresses the total of the consumption energies Ei of the 1st to ith sections of the EV candidate sections that have been reordered in the order of increasing road load.

The driving support 111 then determines whether the consumption energy sum E is greater than the remaining charge of the battery 113 (step S22). If the driving support 111 determines that the consumption energy sum E is not greater than the remaining charge of the battery 113 (step S22: NO), 1 is added to the current value i to renew the value i (i=i+1) (step S27). Thereafter a return to step S21 is performed and the processes of steps S21, S22, and S27 are repeated. That is, the consumption energy Ei of each EV candidate section is integrated one by one in the order starting from the EV candidate section of low road load until the consumption energy sum E becomes greater than the remaining charge of the battery 113.

If the driving support 111 determines that the consumption energy sum E is greater than the remaining charge of the battery 113 (step S22: YES), the EV travel mode is assigned to the 1st to ith EV candidate sections (step S23). The driving support 111 then assigns travel modes to all sections in the travel route (step S24) and ends the travel mode planning process. The HV travel mode is assigned to the EV non-applicable sections and the EV candidate sections to which the EV travel mode was not assigned.

In the present embodiment, the excessive altitude change sections, in which the change of altitude is predicted to be greater than or equal to a predetermined value, are thus identified from the road type, display type, and gradient information and the HV travel mode is assigned with priority to the excessive altitude change sections. Optimization of battery consumption in the travel route is thus promoted.

As described above, the present embodiment achieves the following advantages.

(1) The travel modes of the vehicle 100 are planned such that when there is an excessive altitude change section, in which the change of altitude is predicted to be greater than or equal to a predetermined value, the HV travel mode is assigned with priority to the excessive altitude change section. That is, at a location at which the altitude changes excessively, there is a possibility that the internal combustion engine 115 will be put in operation, and planning is performed so that the HV travel mode is assigned with priority to such a location. Operation of the internal combustion engine 115 in a section in which the EV travel mode is planned as the travel mode of the vehicle 100 can thereby be suppressed. Optimization of battery consumption in the travel route can thus be promoted.

(2) A section that includes at least one of a tunnel, a bridge, and an interchange is identified as an excessive altitude change section and the HV travel mode is assigned with priority to this section. That is, with a tunnel, bridge, or interchange, the elevation difference in the map data may differ from the actual elevation difference and planning is thus performed so that HV travel mode is assigned with priority to such a section. Operation of the internal combustion engine 115 in a section in which the EV travel mode is planned to be assigned as the travel mode of the vehicle 100 can thereby be suppressed further.

(3) A section with which at least one of a river, a lake, and a sea is included in the vicinity of the travel route is identified as an excessive altitude change section and the HV travel mode is assigned with priority to this section. That is, when a river, lake, or sea is present in the vicinity, the elevation difference in the map data may differ from the actual elevation difference and planning is thus performed so that HV travel mode is assigned with priority to such a section. Operation of the internal combustion engine 115 in a section in which the EV travel mode is planned to be assigned as the travel mode of the vehicle 100 can thereby be suppressed further.

(4) The map data does not have to have gradient information. That is, if the map data has gradient information, the excessive altitude change sections can be identified readily.

(5) In addition to the excessive altitude change section, the HV travel mode is assigned with priority to a section including an expressway and a section in the vicinity of the destination. In this case, the priority decreases in the order of the section including an expressway, the excessive altitude change section, and the section in the vicinity of the destination. By such priority assignment, operation of the internal combustion engine 115 in a section in which the EV travel mode is planned to be assigned as the travel mode of the vehicle 100 can be suppressed further. That is, the battery can be consumed in a manner close to the planned manner, and therefore the optimization of battery consumption is promoted further.

The above described embodiment may be modified as follows.

Figure 3:
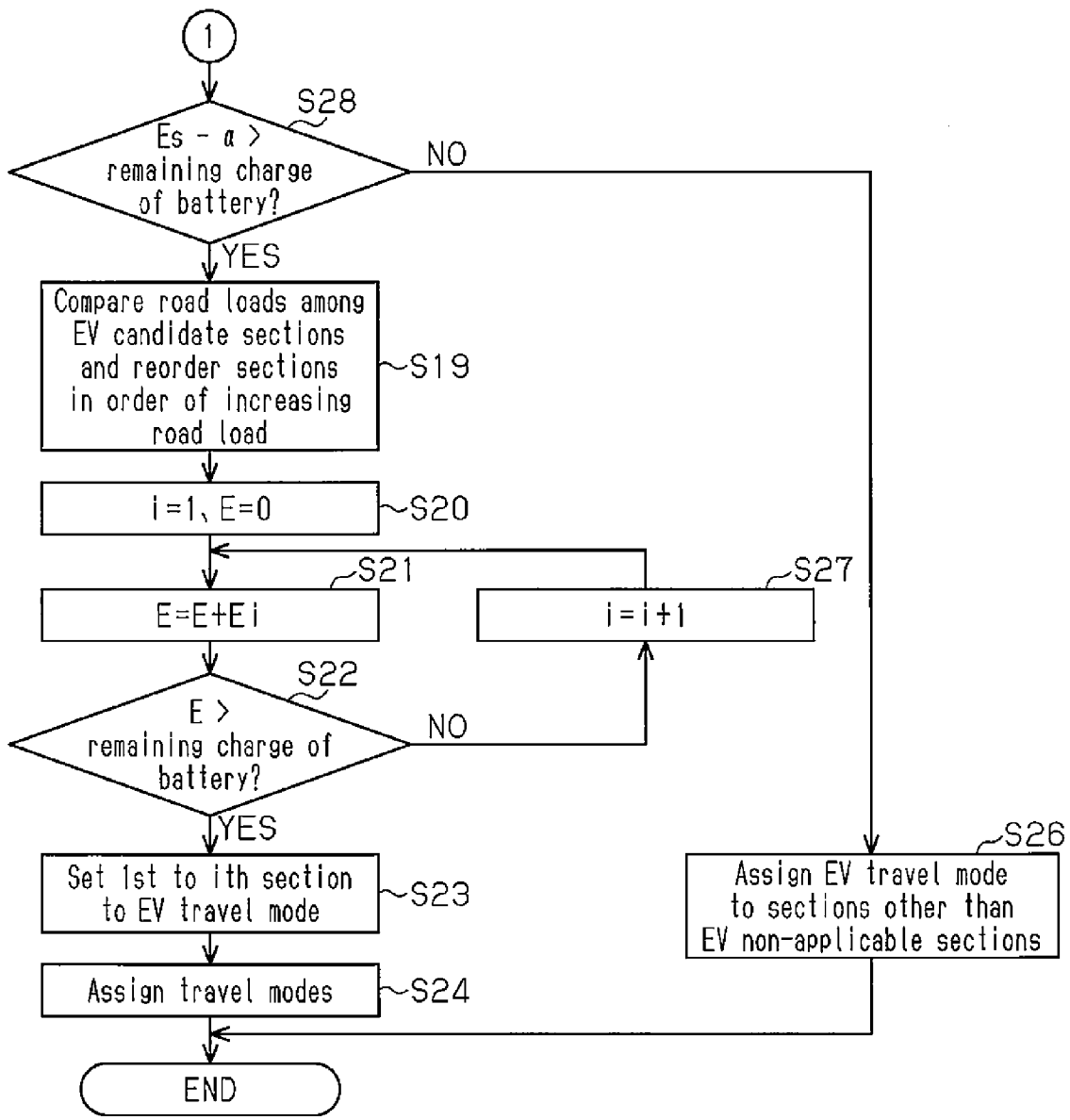
FIG. 3 is a flowchart of a procedure subsequent that of FIG. 2A, showing a modification of the procedure of the travel mode planning process performed by the travel support device shown in FIG. 1.

In step S18 of FIG. 2B of the above illustrated embodiment, it is determined whether the consumption energy sum Es of the EV candidate sections is greater than the remaining charge of the battery 113. However, as a modification of the above illustrated embodiment, it may be determined whether the energy obtained by subtracting an allowance value α from the total consumption energy determined to be required for travelling the travel route is greater than the remaining charge of the battery 113 as shown in step S28 of FIG. 3. The planning of the travel modes is thereby performed so that more energy is consumed in comparison to the above illustrated embodiment and therefore the battery consumption is promoted and especially the optimization of battery consumption near the destination is promoted.

In the above illustrated embodiment, the case where a CAN is used as the on-vehicle network NW is described as an example. However, the present invention is not restricted thereto and as long as an ECU and other components are connected in a communicative manner, another type of network such as Ethernet (registered trademark), FlexRay (registered trademark), or IEEE 1394, that is, FireWire (registered trademark) may be used for the on-vehicle network NW. Alternatively, these networks including a CAN may be used in combination. The flexibility of configuration is thereby improved for the vehicle in which the travel support device is used.

In the above illustrated embodiment, the GPS 101 is connected via the on-vehicle network NW to the navigation controller 121. However, the GPS 101 may be connected directly to the navigation controller 121.

In the above illustrated embodiment, the case where the navigation system 120 and the driving support 111 are configured separately is described as an example. However, the present invention is not restricted thereto and the navigation system and the driving support may be provided in the same device. The flexibility of configuration of the travel support device is thereby improved.

In the above illustrated embodiment, the case where the hybrid controller 110 and the driving support 111 are provided in the same device is described as an example. However, the present invention is not restricted thereto and the hybrid controller and the driving support may be provided in separate devices. The flexibility of configuration of the travel support device is thereby improved.

In the above illustrated embodiment, the case where the respective devices such as the navigation system 120 and the display 123 are provided in the vehicle 100 is described as an example. However, the present invention is not restricted thereto and a portable information processing device such as a portable phone and smartphone may have all or a portion of the functions of the respective devices such as the navigation system and the display. The flexibility of design of the travel support device is thereby improved.

In the above illustrated embodiment, the case where the driving support 111, the navigation system 120, and the map information database 122 are installed in the vehicle 100 is described as an example. However, the present invention is not restricted thereto and a portion of the functions of the driving support, the navigation system, and the map information database may be provided in an information processing device outside the vehicle or provided in a portable information processing device. An information processing device outside the vehicle may be an information processing center, and a portable information processing device may be a portable phone or a smartphone. With an information processing device outside the vehicle, information may be transmitted and received via a wireless communication line. In the case of a portable information processing device, the device may be connected to the on-vehicle network or may be connected by short-range communication, or information may be transmitted and received via a wireless communication line. The flexibility of design of the travel support device is thereby improved.

In the above illustrated embodiment, the case where the road loads of the respective sections in the travel route are acquired or calculated from information included in the map information database is described as an example. However, the present invention is not restricted thereto and the road loads of the respective sections in the travel route may instead be acquired or calculated from a learning database. For example, for a route that has once been traveled on, the road loads required in the route that are stored in the learning database may be utilized. The flexibility of design of the travel support device is thereby improved.

In the above illustrated embodiment, the case where the assignment of the travel modes to the respective sections in the travel route is performed by the driving support 111 is described as an example. However, the present invention is not restricted thereto and such assignment of the travel modes may instead be performed, for example, by the navigation controller. The flexibility of design of the travel support device is thereby improved.

In the above illustrated embodiment, the case where the assignment of the travel modes to the respective sections in the travel route is mainly executed in a process of setting a destination point in a state where the vehicle 100 is stopped at a certain point is described as an example. However, the present invention is not restricted thereto and such assignment of the travel modes may instead be executed at any point at which the vehicle is travelling toward the destination point. Also in executing assignment at any point, the assignment of the appropriate travel modes for all sections in the travel route may be performed. The flexibility of design of the travel support device is thereby improved.

Therefore, the present examples and embodiments are to be considered as illustrative and not restrictive and the invention is not to be limited to the details given herein, but may be modified within the scope and equivalence of the appended claims.

The invention claimed is:

1. A travel support device for supporting a vehicle having both an internal combustion engine and a motor as drive sources to move from a current GPS location to a destination GPS location, the travel support device comprising:
a processor programmed to:
receive the current GPS location from a GPS receiver;
acquire a travel route from the current GPS location to the destination GPS location;
divide the travel route into a plurality of sections; and for each section in the travel route:
  calculate a gradient related to the section and a road load as a load required for traveling the road having the calculated gradient;
  identify whether the section is an excessive altitude change section in which a change of gradient is greater than or equal to a predetermined value;
  if the section is an excessive altitude change section, set a travel mode assigned to the section to a first travel mode, in which a remaining charge of a battery of the vehicle is maintained; and
  if the section is not an excessive altitude change section, set based on the calculated road load associated with the section, the travel mode from among the first mode and a second mode, in which the remaining energy charge of the battery is not maintained; and
  switch or maintain a prioritized drive source of the vehicle to be: (i) when traveling in a section assigned to the first travel mode, the internal combustion engine; and (ii) when traveling in a section assigned to the second travel mode, the motor, thereby improving fuel efficiency by reducing unnecessary operation of the internal combustion engine by operating the internal combustion engine in pre-planned sections that already require use of the internal combustion engine due to the excessive altitude change.

2. The travel support device according to claim 1, wherein the processor is further programmed to identify the excessive altitude change section based on information other than altitude information included in a map database.

3. The travel support device according to claim 1, wherein the processor is further programmed to:
  acquire road types of the travel route from map data, and
  identify a section that includes at least one of a tunnel, a bridge, and an interchange as the excessive altitude change section.

4. The travel support device according to claim 1, wherein the processor is further programmed to:
  acquire display types of areas in the vicinity of the travel route from the map data, and
  identify a section in the vicinity of at least one of a river, a lake, and a sea as the excessive altitude change section.

5. The travel support device according to claim 1, wherein the processor is further programmed to:
  acquire gradient information of the travel route from map data, and
  identify the excessive altitude change section based on the acquired gradient information.

6. The travel support device according to claim 1, wherein the processor is further programmed to: assign the second mode with priority to a section including an expressway and a section in the vicinity of the destination in addition to the excessive altitude change section, wherein the priority decreases in the order of the section including an expressway, the excessive altitude change section, and the section in the vicinity of the destination.

7. The travel support device according to claim 1, wherein the processor is further programmed to use, as energy required for travelling the travel route, energy obtained by subtracting an allowance value from a total consumption energy required for travelling the travel route.

8. A travel support method for supporting a vehicle having both an internal combustion engine and a motor as drive sources to move from a current GPS location to a destination GPS location, the method comprising:
  receiving, by a processor, the current GPS location from a GPS receiver;
  acquiring, by the processor, a travel route from the current GPS location to the destination GPS location;
  dividing, by the processor, the travel route into a plurality of sections;
  for each section in the travel route:
    calculating, by the processor, a gradient related to the section and a road load as a load required for traveling the road having the calculated gradient;
    identifying, by the processor, whether the section is an excessive altitude change section in which a change of gradient is greater than or equal to a predetermined value;
    if the section is an excessive altitude change section, setting, by the processor, a travel mode assigned to the section to a first travel mode, in which a remaining charge of a battery of the vehicle is maintained; and
    if the section is not an excessive altitude change section, setting, by the processor, based on the calculated road load associated with the section, the travel mode from among the first mode a second mode, in which the remaining energy charge of the battery is not maintained; and
  switch or maintain, by the processor, a prioritized drive source of the vehicle to be: (i) when traveling in a section assigned to the first travel mode, the internal combustion engine; and (ii) when traveling in a section assigned to the second travel mode, the motor, thereby improving fuel efficiency by reducing unnecessary operation of the internal combustion engine by operating the internal combustion engine in pre-planned sections that already require use of the internal combustion engine due to the excessive altitude change.

9. The travel support method according to claim 8, further comprising:
  setting the travel mode assigned to the section to the second mode, when the section includes an expressway and/or is a section in a vicinity of the destination GPS location; and
  setting the travel mode assigned to the section based on an order of increasing load of the sections.

10. A drive support system for supporting driving of a vehicle, the drive support system comprising:
  a GPS receiver;
  an internal combustion engine and
  a motor; and
  a travel support device comprising:
    a processor programmed to:
      receive the current GPS location from the GPS receiver;
      acquire a travel route from the current GPS location to the destination GPS location;
      divide the travel route into a plurality of sections;
      for each section in the travel route:
        calculate a gradient related to the section and a road load as a load required for traveling the road having the calculated gradient;
        identify whether the section is an excessive altitude change section in which a change of gradient is greater than or equal to a predetermined value;
        if the section is an excessive altitude change section, set a travel mode assigned to the section to a first travel mode, in which a remaining charge of a battery of the vehicle is maintained; and if the section is not an excessive altitude change section, set based on the calculated road load associated with the section, the travel mode from among the first mode and a second mode, in which the remaining energy charge of the battery is not maintained; and switch or maintain a prioritized drive source of the vehicle to be: (i) when traveling in a section assigned to the first travel mode, the internal combustion engine; and (ii) when traveling in a section assigned to the second travel mode, the motor, thereby improving fuel efficiency by reducing unnecessary operation of the internal combustion engine by operating the internal combustion engine in pre-planned sections that already require use of the internal combustion engine due to the excessive altitude change.

11. The travel support device according to claim 1, wherein the processor is further programmed to calculate the gradient related to the section based on altitudes from map information related to the section.

12. The travel support device according to claim 1, wherein the processor is further programmed to identify the section as an excessive altitude change section based on a type of road of the section.

* * * * *